United States Patent

[11] 3,627,674

| [72] | Inventor | Gary J. Nagl |
| | | Downers Grove, Ill. |
| [21] | Appl. No. | 874,696 |
| [22] | Filed | Nov. 6, 1969 |
| [45] | Patented | Dec. 14, 1971 |
| [73] | Assignee | Universal Oil Products Company |
| | | Des Plaines, Ill. |

[54] CATALYST COMPOSITION AND HYDRODESULFURIZATION WITH AN EXTRUDED COMPOSITE CONTAINING ALUMINA, GROUP VI-B METAL AND ZINC COMPONENT
8 Claims, No Drawings

[52] U.S. Cl................................................ 208/216,
208/455 R, 208/465
[51] Int. Cl............................................ C10g 23/02,
B01j 11/40
[50] Field of Search........................................... 208/216;
252/458, 468, 465, 455 R, 457

[56] References Cited
UNITED STATES PATENTS

| 1,908,286 | 5/1933 | Dorrer | 208/216 |
| 2,518,295 | 8/1950 | Denton et al. | 252/458 |
| 2,781,295 | 2/1957 | Teter et al. | 208/216 |
| 2,842,482 | 7/1958 | Voorhies, Jr. et al. | 252/468 |
| 2,865,845 | 12/1958 | Kearby | 252/458 |
| 3,406,123 | 10/1968 | Sensel et al. | 252/458 |
| Re.26,188 | 4/1967 | Kimberlin, Jr. et al. | 208/216 |
| 2,890,178 | 6/1959 | Thorn et al. | 252/455 R |
| 3,004,929 | 10/1961 | Lucas et al. | 252/455 R |
| 3,347,780 | 10/1967 | Lindquist et al. | 252/455 R |
| 3,390,100 | 6/1968 | Chomitz et al. | 252/457 |
| 3,506,732 | 4/1970 | Crowley et al. | 252/455 R |

*Primary Examiner*—Delbert E. Gantz
*Assistant Examiner*—G. J. Crasanakis
*Attorneys*—James R. Hoatson, Jr. and Robert W. Erickson ABSTRACT: A hydrorefining (desulfurization) catalyst of a coextruded composite of an alumina-containing porous carrier material, a Group VI-B metal component and a zinc component. The Group VI-B metal component constitutes from about 4.0 percent to about 30.0 percent by weight and the zinc component is present in an amount of 1.0 percent to about 10.0 percent by weight, calculated as the elemental metals.

ન3,627,674

CATALYST COMPOSITION AND HYDRODESULFURIZATION WITH AN EXTRUDED COMPOSITE CONTAINING ALUMINA, GROUP VI-B METAL AND ZINC COMPONENT

APPLICABILITY OF INVENTION

Desulfurization of hydrocarbonaceous material is a process well-known throughout the petroleum-refining industry, and published literature abounds with references relative to suitable desulfurization catalysts, methods and techniques of catalyst manufacture, and various operating techniques employed in the utilization thereof. Desulfurization connotes the destructive removal of sulfurous compounds, through conversion thereof into hydrogen sulfide and hydrocarbons, and is often included within the broad term "hydrorefining." Hydrorefining processes are effected at operating conditions conducive to denitrification and desulfurization primarily, and asphaltene conversion, nondistillable hydrocarbon conversion, hydrogenation and hydrocracking to a somewhat lesser extent. In other words, the terms "hydrorefining" and "desulfurization" are generally employed synonymously to allude to a process wherein a hydrocarbonaceous feed stock is "cleaned-up," in order to prepare a charge stock suitable for utilization in subsequent hydrocarbon conversion, and in which process some conversion into lower-boiling products is effected.

Perhaps the most common use of hydrorefining process resides in the production of a substantially saturated naphtha-boiling range charge stock, to serve as the feed to a catalytic reforming process, which charge stock is substantially free from sulfurous and nitrogenous compounds. Desulfurization is not, however, limited to effecting an improvement in the physical and chemical characteristics of a naphtha-boiling range charge stock. The literature abounds with a multitude of processes and catalysts intended for use in the treatment of heavier charge stocks including kerosenes, light gas oils, full boiling range gas oils, heavy gas oils, and even "black oils." In petroleum refining technology, a black oil is considered to be one containing excessive quantities of sulfurous and nitrogenous compounds, high-molecular-weight organometallic complexes, principally comprising nickel and vanadium, and asphaltic material. Black oils are further characterized as those hydrocarbonaceous mixtures containing nondistillable material having a boiling point above a temperature of about 1,050° F.

The process of the present invention is directed toward the use of a novel catalytic composite for desulfurizing hydrocarbonaceous material, and particularly the heavier material known as black oil. An illustrative example of a black oil, to which the present invention is applicable, is a reduced crude having a gravity of about 12.7° API, and containing about 3.67 percent by weight of sulfur, 4,100 p.p.m. by weight of nitrogen and 7.46 percent by weight of heptane-insoluble asphaltenes.

OBJECTS AND EMBODIMENTS

A principal object of the present invention is to provide a novel catalytic composite for use in the desulfurization of hydrocarbonaceous material.

Another object is to provide an improved process for desulfurizing a sulfurous hydrocarbon charge stock, which process is effected utilizing a coextruded catalytic composite of an alumina-containing carrier material, a Group VI-B metal component and a zinc component. Therefore, in one embodiment, the present invention relates to a hydrorefining catalyst of a coextruded composite of an alumina-containing porous carrier material, a Group VI-B metal component and a zinc component.

In another embodiment, the coextruded composite contains from about 4.0 to about 30.0 percent by weight of the Group VI-B metal component and from about 1.0 to about 10.0 percent by weight of the zinc component, calculated as the elemental metals.

In still another embodiment, the hydrorefining conditions include a maximum catalyst bed temperature of 200° F. to about 900° F., a pressure in the range of about 400 to about 5,000 p.s.i.g., an LHSV of 0.1 to about 10.0 and a hydrogen circulation rate of about 1,000 to about 50,000 s.c.f./bbl.

Other objects and embodiments of my invention relate to additional details regarding the catalytic ingredients, the concentration of components within the catalytic composite, a method of catalyst preparation, preferred processing techniques and similar particulars which are hereinafter given in the following, more detailed summary of my invention.

SUMMARY OF MY INVENTION

Catalytic composites intended for utilization in a process for hydrorefining hydrocarbonaceous material, and particularly residual stocks or black oils, have traditionally consisted of an element chosen from the Iron-group metals, particularly nickel or cobalt, in combination with a metal component from the metals of Group VI-B particularly molybdenum or tungsten. In general, preferred metal components are nickel and molybdenum, or nickel or tungsten, and these components are generally combined with a porous carrier material which is either amorphous, or zeolitic in nature. Ample evidence may be found in the literature to indicate that the nickel component, or cobalt component, while present in a significantly lower concentration, materially contributes to the activity of such catalysts.

Furthermore, the prior art includes a preference for two particular methods of catalyst preparation. One method, overwhelmingly preferred, involves impregnating a previously calcined carrier material, generally in the form of spheres or pills, with suitable soluble compounds of nickel and molybdenum, or cobalt and molybdenum, etc. The impregnating technique is generally followed by drying at a temperature of about 300° F. and calcination at a temperature of about 1,100° F. The second preparation scheme involves coprecipitating all the components, including those of the carrier material. For example, an aqueous solution of aluminum chloride, sodium silicate, nickel chloride and molybdenum oxide is formed and coprecipitated by the addition of ammonium hydroxide. The art, while speculatively teaching that the final catalytic composite may take the form of extrudates, quite clearly indicates a predominating preference for spheres and/or pills, which are impregnated with the metal components, or coprecipitated therewith. Investigations into the area of hydrorefining catalysts containing, for example, molybdenum in combination with nickel, indicate that an acceptable black oil desulfurization composite is not readily prepared either by way of impregnation, or through the use of a coprecipitation technique. Although the impregnated nickel/molybdenum catalyst exhibits an acceptable high initial activity, with respect to desulfurization, it also serves to dehydrogenate heavy hydrocarbons, to which the high-molecular-weight species present in black oil are readily susceptible, inherently leading to excessive coke formation. Further investigations indicate that poor results are obtained with a coextruded composite of nickel and molybdenum, which results appear to be inherent in the catalyst manufacturing method. Extrudates are generally prepared by a method which involves coprecipitating the carrier material with the nickel and molybdenum components. The precipitate is filtered and dried, and subsequently rehydrated to a consistency suitable for extrusion purposes. The extrudates are then subjected to drying and high temperature calcination. During this calcination step, the nickel component reacts with the alumina to form a nickel aluminate which in effect significantly reduces the activity of the catalyst with respect to the desulfurization reaction. With respect to catalyst stability, defined in terms of increasing temperature gradient (°F.) per barrel of fresh charge stock per pound of catalyst (°F./BPP.), in order to maintain a product sulfur level of 1.0 percent by weight, a coextruded nickel/molybdenum catalyst is significantly less stable than the standard impregnated nickel/molybdenum catalyst. In accordance with my invention, the desulfurization reaction is effected utilizing a coextruded catalyst containing molybdenum and zinc, in which the zinc component is believed to be in the form of zinc aluminate. While the initial desulfurization activity is somewhat less than that of the impregnated nickel/molybdenum catalyst, the low dehydrogenation activity of the zinc/molybdenum catalyst provides a surprising degree of catalyst stability. This result is illustrated in a specific example hereinafter set forth.

Attendant advantages of a coextruded composite include the attractive economics of a more simple and faster catalyst preparation technique. It will immediately be recognized by those possessing expertise in the art of catalyst manufacturing, that coextrusion eliminates several tedious steps involved, for example, in an impregnation scheme. Further, large capacity equipment is possible, leading to greater catalyst production over a shorter period of time. One principal advantage resides in the production of catalyst particles, or coextrudates, having pore diameters in the highly desired range of about 100 to about 300 Angstroms. Control of the pore diameter, or size, is readily regulated by the pressure imposed during the formation of the extrudates. With respect to spheres and/or pills, control of the pore diameter is available only through the tedious regulation of the apparent bulk density.

Considering first the porous carrier material, it is preferred that it be an adsorptive, high-surface-area support. Suitable carrier materials are selected from the group of alumina-containing amorphous refractory inorganic oxides, including alumina in and of itself, and in admixture with titania, zirconia, chromia, silica, magnesia, boria, for example alumina-silica, alumina-silica-zirconia, alumina-silica-boron phosphate, etc. When of the amorphous refractory inorganic oxide type, a preferred carrier material consists essentially of alumina, or a composite of alumina and silica, with silica being present in an amount of from about 10.0 to about 90.0 percent by weight. In many applications of the present invention, the carrier material will consist, at least in part, of a crystalline aluminosilicate. This may be naturally occurring, or synthetically prepared, and includes mordenite, faujasite, Type A or Type U molecular sieves, etc. When a crystalline aluminosilicate, or zeolitic material is intended for use as the carrier material, it may be prepared in a number of ways known in the art. One common method is to mix solutions of sodium silicate, or colloidal silica, and sodium aluminate, and permit the solutions to react to form a solid crystalline aluminosilicate. Another method is to contact a solid inorganic oxide from the group of silica, alumina and mixtures thereof with an aqueous treating solution containing alkali metal cations (preferably sodium) and anions selected from the group of hydroxyl, silicate and aluminate, and permit the solid-liquid mixture to react until the desired crystalline aluminosilicate has been formed. In addition to the foregoing, the carrier material may comprise a combination in which the zeolitic material is dispersed within an amorphous matrix, the latter being alumina, silica, or silica-alumina. It is understood that the coextrusion scheme employed for preparing the catalyst of the present invention does not involve coprecipitation of the active metal components along with the carrier material. The latter is preformed prior to any contact with the zinc and molybdenum, or tungsten.

Following the formation of the coextruded extrudates, the final composite will generally be dried at a temperature in the range of about 200° F. to about 600° F., for a period of from one-half hour to about 24 hours or more, and finally calcined at a temperature of about 700° F. to about 1,200° F. in an atmosphere of air, for a period of about 0.5 to about 10 hours. When the carrier material comprises a crystalline aluminosilicate, it is preferred that the calcination temperature not exceed about 1,000° F.

METHOD OF CATALYST PREPARATION

In one possible catalyst preparation technique, when the catalyst is intended to comprise silica, the initial step involves commingling the preformed carrier material, for example, a composite of 88.0 percent by weight of alumina and 12.0 percent by weight of silica with suitable salts of zinc and molybdenum, or zinc and tungsten. Such salts include ammonium molybdate, molybdic acid, ammonium tungstate, tungstic acid, zinc acetate, zinc bromide, zinc chloride, zinc sulfate, zinc nitrate hexahydrate, zinc nitrate trihydrate, etc. The solid mixture is ground to a talclike powder, about 20 to 100 mesh, and preferably from 30 to 50 mesh, and intimately admixed with a relatively minor quantity of a suitable acid including hydrochloric acid, nitric acid, hydrofluoric acid, etc. The mixture is mulled and subsequently aged for a short period of about 15 minutes to about 2 hours. The resulting plastic-type mass is extruded under a suitable pressure in the range of about 1,000 to about 10,000 p.s.i.g., to form extrudates of the desired size—e.g. one-sixteenth inch by one-sixteenth inch. The formed extrudates are dried and calcined in the manner hereinbefore set forth.

Although not essential to successful desulfurization, a halogen component is often incorporated into the catalytic composite. Although the precise form of the chemistry of association of the halogen component with the carrier material and metallic components is not accurately known, it is customary in the art to refer to the halogen component as being combined with the carrier material or with the other ingredients of the catalyst. The halogen may be either fluorine, chlorine, iodine, bromine, or mixtures thereof, with the fluorine and chlorine being particularly preferred. The quantity of halogen is such that the final catalytic composite contains about 0.1 to about 3.0 percent by weight, and preferably from about 0.5 to about 1.5 percent by weight, calculated on the basis of the elemental halogen.

Prior to its use in the hydrorefining of hydrocarbons, the resultant catalytic composite may be subjected to a substantially water-free reduction technique. Substantially pure and dry hydrogen (less than about 30.0 vol. p.p.m. of water) is employed as the reducing agent. The calcined composite is contacted at a temperature of about 800° F. to about 1,200° F., and for a period of about 0.5 to about 10 hours. The reduction may be performed in situ prior to introducing the charge stock.

Additional improvements are generally obtained when the reduced composite is subjected to a presulfiding operation for the purpose of incorporating therewith from about 0.05 to about 0.5 percent by weight of sulfur on an elemental basis. The presulfiding treatment is effected in the presence of hydrogen and a suitable sulfur-containing compound such as hydrogen sulfide, low-molecular weight-mercaptans, various organic sulfides, carbon disulfide, etc. One technique involves treating the reduced catalyst with a sulfiding gas, such as a mixture of hydrogen and hydrogen sulfide having about 10 mols of hydrogen per mol of hydrogen sulfide, at conditions selected to effect the desired incorporation of sulfur. Presulfiding may also by effected in situ by way of charging a relatively low-boiling hydrocarbon feed containing sulfurous compounds. In situ reduction and presulfiding may be effected simultaneously utilizing circulating hydrogen and the low-boiling feed stock.

In accordance with my invention, the hydrocarbon charge stock and hydrogen are contacted with the catalyst of the type described above in a hydrocarbon conversion zone. The contacting may be accomplished by using the catalyst in a fixed-bed system, a moving-bed system, a fluidized-bed system or in a batch-type operation. In view of the risk of attrition loss of the catalyst, it is preferred to use a fixed-bed system. In this type of system, a hydrogen-rich vaporous phase and the charge stock are preheated by any suitable heating means to the desired initial reaction temperature, the mixture being passed into the conversion zone containing the fixed-bed of the catalytic composite. It is understood, of course, that the hydrocarbon conversion zone may consist of one or more separate reactors having suitable means therebetween to insure that the desired conversion temperature is maintained at the entrance to one or more catalyst beds. The reactants may be contacted with the catalyst in either upward, downward, or radial flow fashion, with a downward/radial flow generally being preferred.

The operating conditions imposed upon the reaction zone, or zones, are primarily dependent upon the charge stock properties and the desired end result. However, these conditions will generally include a maximum catalyst bed temperature of about 200° F. to about 900° F., a pressure of about 400 to about 5,000 p.s.i.g., an LHSV of about 0.1 to about 10.0 and a hydrogen circulation rate of about 1,000 to about 50,000 s.c.f./bbl. Hydrorefining reactions are generally exothermic in nature, and an increasing temperature gradient will be experienced as the hydrogen and feed stock traverse the catalyst bed. It is desirable to maintain the maximum catalyst bed temperature below about 900° F., which temperature is virtually identical to that which may be conveniently measured at the outlet of the reaction zone. In order to insure that the catalyst bed temperature does not exceed the maximum allowed, conventional quench streams, either normally liquid or normally gaseous, introduced at one or more intermediate loci of the catalyst bed, may be utilized. In some situations, a heavy hydrocarbonaceous material is intended for hydrorefining, accompanied by partial conversion into lower-boiling hydrocarbon products. A portion of the normally liquid product effluent boiling above the end boiling point of the desired product will generally be recycled to combine with the fresh feed charge stock. In this type of process, the combined liquid feed ratio (defined as volumes of total liquid charge to the reaction zone per volume of fresh liquid charge to the reaction zone) will be within the range of about 1.1 to about 6.0.

ILLUSTRATIVE EXAMPLE

Specific operating conditions, processing techniques, a particular catalytic composite and other individual process details will be given in the following description. In presenting this illustration, it is not intended that the present invention be limited to the specifics, nor is it intended that a given process be limited to the particular operating conditions, catalytic composite, processing techniques, charge stock, etc. Therefore, it is understood that the present invention is merely illustrated by the specifics hereinafter set forth.

With respect to the following, the principal differences in processing results involve activity and stability. While the initial activity of the zinc/molybdenum catalyst is less than that of the nickel/molybdenum catalyst, the former is extremely stable when processing the high sulfur-containing feed stocks. Less cracking is observed with the zinc/molybdenum catalyst as evidenced by a less hydrogen consumption than that experienced with the nickel/molybdenum catalyst system. At similar processing conditions, and equivalent catalyst life, expressed as barrels of fresh feed per pound of catalyst disposed in the reaction zone, the coke deposition on the zinc/molybdenum catalyst is considerably less than that deposited on the nickel/molybdenum catalyst.

A desulfurization catalyst was prepared by commingling 603 grams of alumina, ground to a talclike powder, and 40 cc. of concentrated nitric acid in 560 cc. of water. The mixture was allowed to stand for a period of about one-half hour, at the end of which time a zinc/molybdenum solution was added. The zinc/molybdenum solution was prepared by dissolving 105.9 grams of molybdic acid (85.0 percent by weight molybdenum trioxide) in 120 cc. of water and 54 cc. of a 28.0 percent by weight solution of ammonia. To this was added a solution of 109.5 grams of zinc nitrate dissolved in 108 cc. of water and 120 cc. of 28.0 percent by weight ammonia. The entire mixture was subjected to mulling and quiescently aged for a period of about 15 minutes. At this point, the contents were too liquid for proper extrusion, and evaporation was effected over boiling water until the right consistency was obtained. The material was then extruded, dried for 1 hour at a temperature of 225° F., and calcined for a period of about 3 hours at a temperature of about 1,100° F. Analyses indicated an apparent bulk density of 0.799, and X-ray analysis showed the catalyst to contain about 4.5 percent by weight of zinc and 9.2 percent by weight of molybdenum.

A second catalyst was prepared by impregnating calcined spheres of 88.0 percent by weight alumina, 12.0 percent by weight of silica, with nickel nitrate hexahydrate and molybdic acid in amounts sufficient to result in a final catalytic composite containing about 1.88 percent by weight of nickel and 15.75 percent by weight of molybdenum, calculated as the elemental metals. The two catalysts were individually and separately tested for desulfurization activity and stability by processing a reduced crude oil having a gravity of 10.2° API. Other charge stock properties include an initial boiling point of 590° F., a 30.0 percent by volume distillation temperature of 859° F. and a 55.0 percent by volume distillation temperature of 1,030° F.; contaminating influences include 5.2 percent by weight of sulfur, 2,900 p.p.m. by weight of nitrogen, 9.1 percent by weight of heptane-insolubles and 87.0 p.p.m. by weight of metallic contaminants. The results are summarized in the following tabulation.

TABLE I: Reduced Crude Desulfurization

| Catalyst | Nickel-Molybdenum | Zinc-Molybdenum |
|---|---|---|
| Pressure, p.s.i.g. | 1,900 | 2,000 |
| LHSV | 0.8 | 0.8 |
| Hydrogen Concentration* | 5,000 | 5,000 |
| Product Gravity, °API | 20.8 | 18.8 |
| Hydrogen Consumption* | 1,250 | 970 |
| Initial Peak Temperature to Attain 1.0% Sulfur, ° F. | 755 | 775 |
| Deactivation Rate** | 21.6 | 7.3 |

* Values in s.c.f./bbl.

** Deactivation Rate is defined as temperature increase, ° F., per barrel of fresh feed charged per pound of catalyst disposed in the reaction zone (° F./BPP)

It will be noted that the coextruded zinc-molybdenum is virtually three times as stable as the nickel-molybdenum catalyst, and that the initial higher activity of the latter, represented by a 20° F. lower temperature requirement when first achieving 1.0 percent sulfur in the product effluent, fades into insignificance when the exceedingly high deactivation rate is considered.

A second desulfurization operation was carried out in order to compare the coextruded zinc-molybdenum catalyst with one which was prepared by way of impregnation. A different reduced crude was used as the charge stock. Properties include a gravity of 12.7° API, an initial boiling point of 665° F., a 30.0 percent volumetric distillation temperature of 851° F., a 50.0 percent volumetric distillation temperature of 945° F. and a 65.0 percent distillation temperature of 1,045° F. Contaminating influences are 3.67 percent by weight of sulfur, 4,100 p.p.m. by weight of nitrogen, 144 p.p.m. by weight of metals and 7.46 percent by weight of heptane-insolubles.

The coextruded catalyst was prepared by commingling 40 cc. of concentrated nitric acid and 603 grams of alumina in 560 cc. of water. After a ½-hour period, 105.9 grams of molybdic acid (85.0 percent molybdenum trioxide) in 120 cc. of water and 54 cc. of a 28.0 percent by weight ammonia solution, and 109.5 grams of zinc nitrate in 108 cc. of water and 120 cc. of 28.0 percent ammonia were added. The entire mixture was manually mulled and aged quiescently for about 15 minutes. Since the mixture was too thin for proper extrusion, water was evaporated until the proper consistency was obtained. The material was extruded, the extrudates dried for 1 hour at 225° F. and calcined for 3 hours. Calcination was initiated at 500° F., the temperature uniformly increased to 1,100° F., and maintained at the higher level for a 1-hour period. The calcined material indicated an apparent bulk density of 0.799, and contained 4.5 percent zinc and 9.2 percent by weight of molybdenum.

With respect to the impregnated zinc-molybdenum catalyst, 85.5 grams of alumina/silica spheres, 88.0 percent by weight of alumina were impregnated in a rotary drier with 34.73 grams of molybdic acid in 50 cc. of water and 26 cc. of 28.0 percent ammonia, and 22.48 grams of zinc nitrate in 20 cc. of water and 27 cc. of 78.0 percent ammonia. After impregnating and drying at 225° F. in the rotary drier, the composite was calcined for 3 hours from 500° F. to 1,100° F., 1 hour at the higher temperature. The ABD was 0.735, and the catalyst was found to contain 4.3 percent of zinc and 17.3 percent by weight of molybdenum. The results obtained, processing the reduced crude, at 2,000 p.s.i.g., 1.2 LHSV and 5,700 s.c.f./bbl. hydrogen concentration, are presented in tables II and III.

TABLE II: Impregnated Zinc-Molybdenum Catalyst

| Hours on Stream | Temperature, °F. | Sulfur, wt.% |
|---|---|---|
| 18–26 | 721 | 2.11 |
| 26–50 | 764 | 1.53 |
| 50–82 | 786 | 1.29 |

TABLE III: Coextruded Zinc-Molybdenum Catalyst

| Hours on Stream | Temperature, °F. | Sulfur, wt. % |
|---|---|---|
| 18–42 | 724 | 2.09 |
| 42–82 | 759 | 1.37 |
| 82–130 | 776 | 1.14 |
| 130–170 | 789 | 1.03–1.07 |
| 170–274 | 784 | 1.12 |
| 274–418 | 793 | 0.99–1.05 |

Although the initial activity of the catalysts approximate each other, having like residual product sulfur levels at comparable maximum catalyst temperatures, the pronounced difference in stability is readily ascertained from the foregoing figures. With respect to the impregnated catalyst, from 18–82 hours on stream, a temperature increase factor of 1.01° F./hr. was needed to achieve 1.29 percent by weight residual sulfur, whereas the coextruded catalyst, during the 18–130 period, indicated a temperature increase factor of 0.46° F./hr. to achieve a sulfur level of 1.14 percent by weight. Extending the period to 418 hours of on-stream time, the temperature increase factor for the coextruded catalyst is 0.17° F./hr., with a residual sulfur level of 0.99 to 1.05 percent by weight.

I claim as my invention:

1. A hydrorefining catalyst comprising a coextruded composite of an alumina-containing porous carrier material, a Group VI–B metal component and a zinc component, said catalyst having been prepared by mixing a preformed porous carrier material selected from the group consisting of alumina and alumina-silica, said silica being present in an amount of from about 10.0 to about 90.0 percent by weight, with Group VI–B metal component and zinc component, extruding the resulting mixture, and drying and calcining the resulting extrudate.

2. The catalyst of claim 1 further characterized in that said Group VI–B metal component is molybdenum, or a compound of molybdenum.

3. The catalyst of claim 1 further characterized in that said Group VI–B metal component is tungsten, or a compound of tungsten.

4. The catalyst of claim 1 further characterized in that said carrier material is amorphous.

5. A hydrorefining catalyst comprising coextruded composite of an alumina-containing porous carrier material, from about 4.0 to about 30.0 percent by weight of a Group VI–B metal component and from about 1.0 to about 10.0 percent by weight of a zinc component, said catalyst having been prepared by mixing a preformed porous carrier material selected from the group consisting of alumina and alumina-silica, said silica being present in an amount of from about 10.0 to about 90.0 percent by weight, with Group VI–B metal component and zinc component, extruding the resulting mixture, and drying and calcining the resulting extrudate.

6. A process for desulfurizing a sulfurous hydrocarbon charge stock which comprises reacting said charge stock and hydrogen, at desulfurizing conditions selected to convert sulfurous hydrocarbons into hydrogen sulfide and hydrocarbons, in contact with a catalyst comprising coextruded particles of a composite of an alumina-containing carrier material, from 4.0 to about 30.0 percent by weight of a Group VI–B metal component and from about 1.0 to about 10.0 percent by weight of a zinc component, said catalyst having been prepared by mixing a preformed porous carrier material selected from the group consisting of alumina and alumina-silica, said silica being present in an amount of from about 10.0 to about 90.0 percent by weight with Group VI–B metal component and zinc component, extruding the resulting mixture, and drying and calcining the resulting extrudate.

7. The process of claim 6 further characterized in that said charge stock is a black oil.

8. The process of claim 6 further characterized in that said desulfurizing conditions include a pressure of from 400 to about 5,000 p.s.i.g., a liquid hourly space velocity from 0.1 to about 10.0, a hydrogen circulation rate of 1,000 to about 50,000 s.c.f./bbl. and a maximum catalyst bed temperature of 200° F. to about 900° F.

* * * * *